(12) United States Patent
Ab. Hamid (10) Patent No.: US 11,713,670 B2
(45) Date of Patent: Aug. 1, 2023

(54) CASING COLLAR LOCATOR FOR DRILL PIPE

(71) Applicant: SAUDI ARABIAN OIL COMPANY, Dhahran (SA)

(72) Inventor: Abdul Halim Ab. Hamid, Udhailyah (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 113 days.

(21) Appl. No.: 17/491,135

(22) Filed: Sep. 30, 2021

(65) Prior Publication Data

US 2023/0102387 A1    Mar. 30, 2023

(51) Int. Cl.
| | |
|---|---|
| *E21B 34/06* | (2006.01) |
| *E21B 47/04* | (2012.01) |
| *E21B 47/09* | (2012.01) |
| *E21B 34/14* | (2006.01) |
| *G01V 3/26* | (2006.01) |

(52) U.S. Cl.
CPC ............ *E21B 47/09* (2013.01); *E21B 34/066* (2013.01); *E21B 34/14* (2013.01); *E21B 47/04* (2013.01); *G01V 3/26* (2013.01)

(58) Field of Classification Search
CPC ......... E21B 47/04; E21B 47/092; G01V 3/26; G01V 3/30
See application file for complete search history.

(56) References Cited

U.S. PATENT DOCUMENTS

| | | |
|---|---|---|
| 4,808,925 A | 2/1989 | Baird |
| 5,720,345 A | 2/1998 | Price et al. |
| 6,543,280 B2 | 4/2003 | Duhon |
| 6,768,299 B2 | 7/2004 | Almaguer |
| 7,055,601 B2 | 6/2006 | Barrow |
| 8,528,637 B2 | 9/2013 | Cresswell et al. |
| 10,494,917 B2 | 12/2019 | Stark et al. |
| 2003/0052670 A1 | 3/2003 | Miszewski |
| 2007/0051512 A1 | 3/2007 | Markel et al. |
| 2012/0298243 A1 | 11/2012 | Zierolf |
| 2015/0176384 A1 | 6/2015 | Castillo et al. |
| 2017/0298723 A1* | 10/2017 | Flores Perez ............ G01V 1/40 |

FOREIGN PATENT DOCUMENTS

WO    2017/180271 A1    10/2017

* cited by examiner

*Primary Examiner* — Robert E Fuller
*Assistant Examiner* — Lamia Quaim
(74) *Attorney, Agent, or Firm* — Osha Bergman Watanabe & Burton LLP (57) ABSTRACT

A system for locating a casing collar includes a drill pipe sub-assembly with a drill pipe segment and detection apparatus. The detection apparatus includes a bypass port disposed in a wall of the drill pipe segment; an annular sleeve which directs fluid through the bypass port and into a drill pipe segment interior portion; an actuator which opens and closes the bypass port; and two magnetized coils which generate an electromagnetic field. The actuator closes the bypass port in response to a predetermined voltage generated by the magnetized coils when they displace past a casing collar. Also included are a weight loss detection device which detects a loss of weight in the drill pipe segment, and a depth determination device which determines a depth of the casing collar, based on detected loss of weight. Also disclosed and described are a related method and drill pipe sub-assembly.

20 Claims, 7 Drawing Sheets

CASING COLLAR LOCATOR FOR DRILL PIPE

BACKGROUND

In oilfield and analogous settings, a casing is a larger-diameter pipe which is lowered into a wellbore and cemented into place. Smaller segments of casing, i.e., of limited and predetermined axial length, are typically interconnected via threaded collars. Usually, there are several nested casings of progressively smaller diameter and progressively longer axial length, of which the innermost, and longest, is a production casing.

When deploying a drill string (e.g., including drill pipe) or other components (e.g., a slickline or wireline) into the wellbore and inside the generally cylindrical space defined by a production casing, it is often important to be able to accurately detect locations of the casing collars. This assists in the correct placement of components such as downhole bridge plugs, whipstocks, and perforations, among many other possibilities.

Conventional techniques for locating casing collars are generally inefficient, time-consuming and costly. One currently known technique involves the use of wireline logs, with measurements taken via one or more instruments lowered into the wellbore via a wireline. This normally requires an additional service provider to run (or deploy) their own wireline tools into the wellbore. Related costs and inefficiencies have proven to be excessive.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for locating a casing collar. The system includes a drill pipe sub-assembly which includes a drill pipe segment and a detection apparatus disposed at a portion of the drill pipe segment, the drill pipe segment including a wall and an interior portion defined within the wall. The detection apparatus includes: a bypass port disposed in the wall and in fluid communication with the interior portion; an annular sleeve which directs fluid through the bypass port and into the interior portion; an actuator which opens and closes the bypass port; and two magnetized coils which interact to generate an electromagnetic field. The actuator closes the bypass port in response to a predetermined voltage generated by the magnetized coils when the coils displace past a casing collar. Also included are a weight loss detection device which detects a loss of weight in the drill pipe segment after closing of the bypass port, and a depth determination device which determines a depth of the casing collar, based on the detected loss of weight.

In one aspect, embodiments disclosed herein relate to a method that includes providing a drill pipe sub-assembly including a drill pipe segment and a detection apparatus disposed at a portion of the drill pipe segment, the drill pipe segment including a wall and an interior portion defined within the wall. Providing a detection apparatus includes: disposing a bypass port in the wall and in fluid communication with the interior portion; and providing two magnetized coils which interact to generate an electromagnetic field. The method further includes deploying the sub-assembly into a casing in the wellbore; directing fluid through the bypass port into the interior portion; displacing the sub-assembly past a casing collar, and thereupon closing the bypass port in response to a predetermined voltage generated by the magnetized coils; detecting a loss of weight in the drill pipe segment after closing of the bypass port; and determining a depth of the casing collar, based on the detected loss of weight.

In one aspect, embodiments disclosed herein relate to a drill pipe sub-assembly including: a drill pipe segment including a wall and an interior portion defined within the wall; and a detection apparatus disposed at a portion of the drill pipe segment. The detection apparatus includes: a bypass port disposed in the wall and in fluid communication with the interior portion; an annular sleeve which directs fluid through the bypass port and into the interior portion; an actuator which opens and closes the bypass port; and two magnetized coils which are generally annular shape, are axially spaced apart from one another along the drill pipe segment, and interact to generate an electromagnetic field. The bypass port is located axially between the two magnetized coils, and the annular sleeve is axially spaced apart from one of the magnetized coils, and on a different side thereof from the bypass port. The actuator closes the bypass port in response to a predetermined voltage generated by the magnetized coils when the coils displace past a casing collar.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

By way of general background in accordance with one or more embodiments, fluids are typically produced from a reservoir in a formation by drilling a wellbore into the formation, establishing a flow path between the reservoir and the wellbore, and conveying the fluids from the reservoir to the surface through the wellbore. Typically, a section of the wellbore is drilled at a time; then a casing is lowered into the wellbore and cemented before drilling the next section A casing profile can include multiple casing strings, such as a conductor casing, surface casing, intermediate casing and production casing. Furthermore, each casing string is cemented in place at its outer (cylindrical) external surface.

Typically, a large-diameter conductor casing protects shallow formations from contamination by drilling fluid and helps prevent washouts involving unconsolidated topsoil and sediments. Surface casing, which is a second string coaxially nested within the conductor casing, has a smaller diameter, maintains borehole integrity and prevents contamination of shallow groundwater by hydrocarbons, subterranean brines, and drilling fluids. Intermediate casing then isolates hydrocarbon-bearing, abnormally pressured, fractured and lost circulation zones, and also providing well control as drilling proceeds more deeply. Multiple strings of intermediate casing may be set in order to reach a target producing zone. The production casing, or liner, is the last and smallest-diameter tubular element in the wellbore; it isolates the zones above and within the production zone and withstands anticipated loads during the life of the well.

Figure 1:
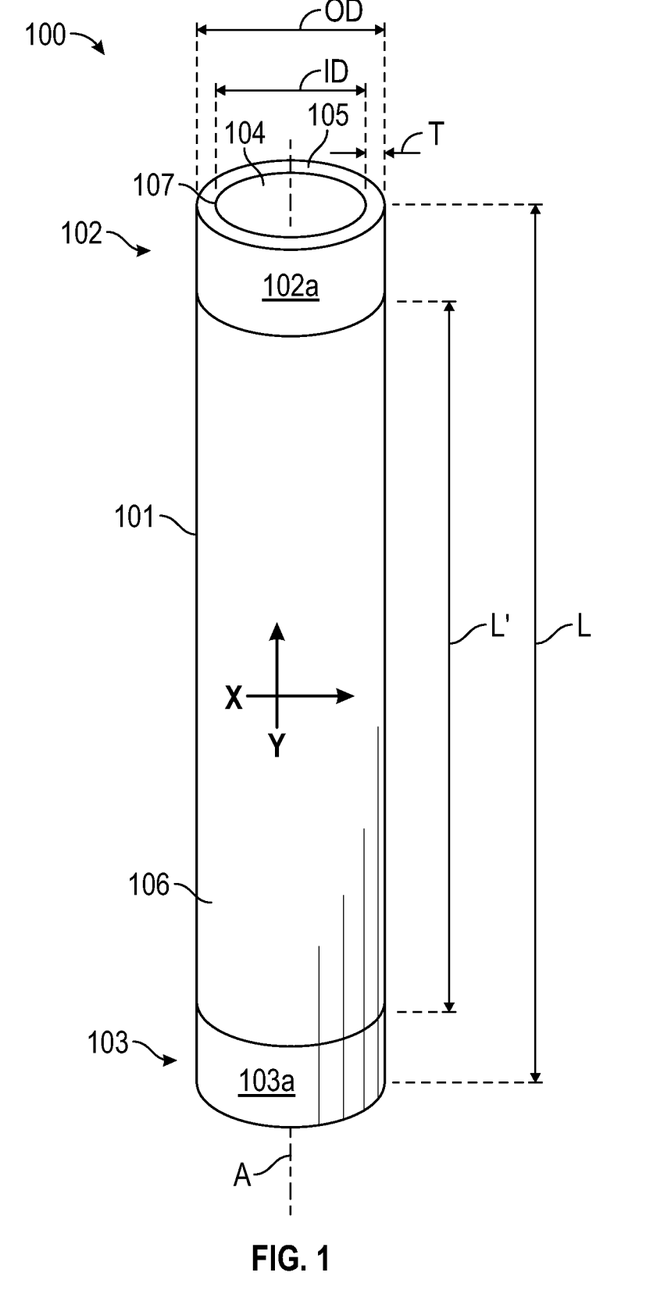
FIG. 1 is a schematic elevational view of a casing in accordance with one or more embodiments.
Figure 2:
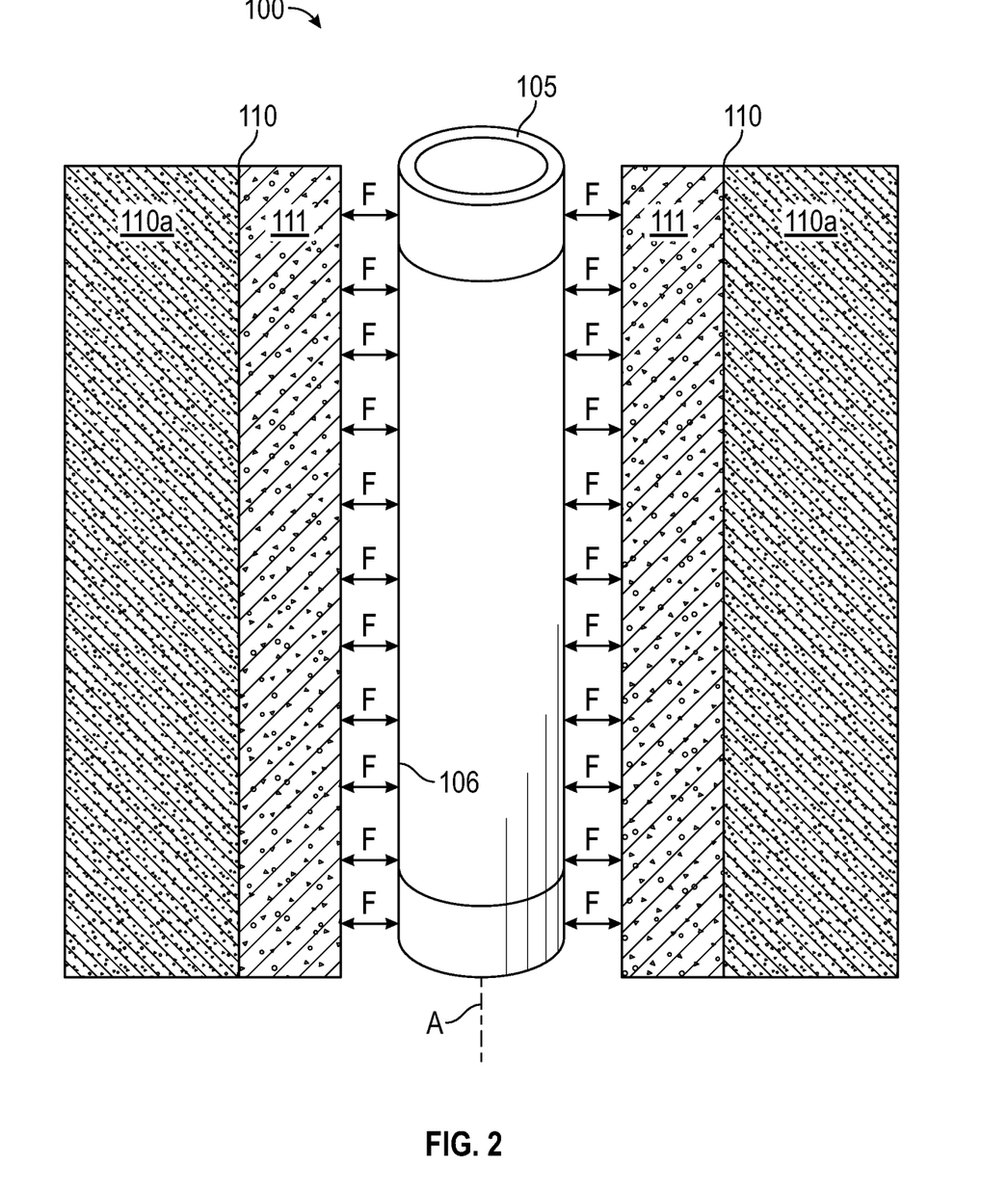
FIG. 2 is a schematic elevational view of the casing of FIG. 1, disposed within a wellbore, in accordance with one or more embodiments.
Figure 3:
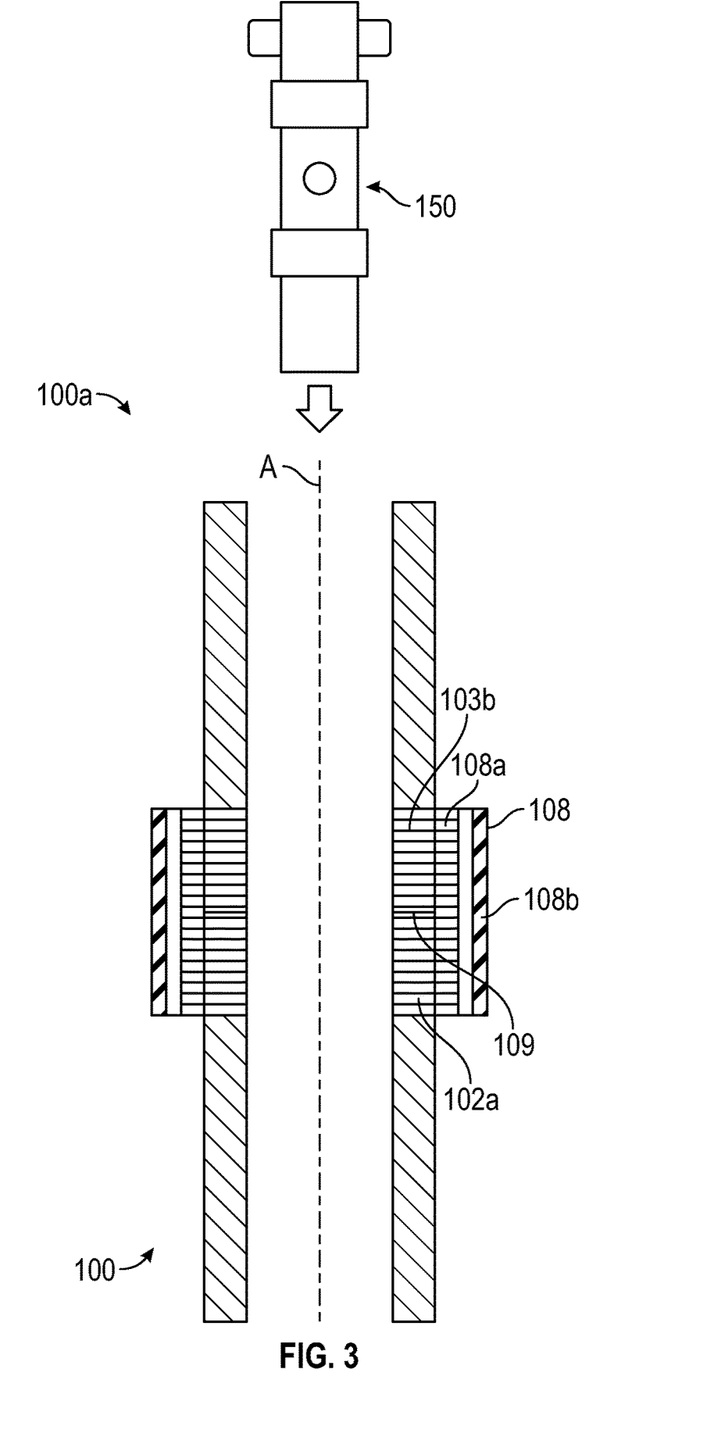
FIG. 3 is an elevational cross-sectional view of a connected pair of casings, in accordance with one or more embodiments.

As such, FIGS. 1-3 illustrate a general environment in which one or more embodiments may be employed. Illustrated are casings 100 and 100a (e.g., as portions of a production casing string) within which a drill pipe sub-assembly in accordance with one or more embodiments may be employed. It should be understood that the casings 100/100a and related aspects are presented merely by way of illustrative and non-restrictive example.

Referring to FIG. 1, a casing 100 in accordance with one or more embodiments is illustrated. The casing 100 has a tubular body 101 axially extending over a length L from a first end 102 to a second end 103. The tubular body 101 includes a generally cylindrical bore 104 extending therein from the first end 102 to the second end 103 about a central longitudinal axis A, and is defined within a generally cylindrical wall 105. The wall 105 thus has a thickness T defined radially between an outer diameter (OD) of the tubular body 101 (at an exterior, generally cylindrical surface 106) and an inner diameter (ID) of the tubular body 101 (at an interior, generally cylindrical surface 107).

In accordance with one or more embodiments, the first end 102 of casing 100 may include a first joint connection 102a and the second end 103 may include a second joint connection 103a. In a non-limiting example, the joint connections 102a, 103a may be externally threaded to facilitate connecting the casing 100 to one or more other casings (e.g., such as casing 100a shown in FIG. 3) to form a casing string, via one or more internally threaded casing collars or other connection hardware (e.g., such as collar 108 in FIG. 3). Depending on the location of the casing 100 along a casing string, one of the joint connections 102a, 103a may be used to connect the casing 100 to a linear hangar or wellhead.

In one or more embodiments, the tubular body 101 extends over a second length L' between the joint connections 102a, 103a. Additionally, the outer surface 106 of the tubular body 101 between the joint connections 102a, 103a may be exposed to cement and a formation within a wellbore. Accordingly, FIG. 2 is a schematic elevational view of the casing of FIG. 1, disposed within a wellbore, in accordance with one or more embodiments. As shown in FIG. 2, the casing 100 may be lowered into a wellbore 110 drilled within a formation 110a. Cement may then be pumped into the wellbore 110 to form a generally cylindrical (and annular) cement layer 111 between the casing 100 and the formation 110a. The cement layer 111 then cements the outer surface 106 of the casing 100 to the wellbore 110 (which itself may be of a smaller diameter than other sections of wellbore positioned axially above, themselves lined with one or more larger-diameter casings). The casing 100 cement layer 111 may apply generally radial forces F on each other through the life of the well. (While a gap is shown between the casing 100 and the cement layer 111, this gap is merely shown for illustrative purposes, to readily illustrate the arrows F between the casing 100 and the cement layer 111.)

FIG. 3 is an elevational cross-sectional view of a connected pair of casings, in accordance with one or more embodiments. As shown, first casing 100 (similar or analogous to that shown in FIGS. 1 and 2) is connected to a second casing 100a (which itself may be configured similarly or analogously to the casing 100 shown in FIGS. 1 and 2). As shown, the first casing 100 is disposed axially below the second casing 100a, and a scheme of their interconnection is shown. Thus, the first (externally threaded) joint connection 102a of the first casing 100 may be connected to a second (externally threaded) joint connection 103b of the second casing 100a via an internally threaded collar or coupling 108, as generally known. The collar or coupling 108 may be a short cylindrical/annular pipe with an inner threaded connection surface 108a. At the outer surface of collar 108, an outer layer 108b of predetermined material may be included (e.g., as a protective layer). Thus, to form a rigid connection between the casings 100 and 100a, the internal threading of the inner connection surface 108a engages with the external threading of the first joint connection 102a (of the first casing 100) and the second joint connection 103b (of the second casing 100a). Via that connection, the first casing 100 and the second casing 100a are brought into direct face contact with each other to form a seal 109.

In accordance with one or more embodiments, a dedicated sub-assembly 150 of a drill string (hereinafter also termed the "DP-CCL sub") is also illustrated in FIG. 3. As will be better appreciated herebelow, the sub 150 may form a portion of a longer drill string which is deployed into the wellbore within a production casing string such as that shown in FIG. 3 (and which includes, e.g., casings 100 and 100a). As will also be appreciated herebelow, sub 150 may be configured to readily detect the presence and location of a collar/coupling such as that indicated at 108.

As such, in accordance with one or more embodiments, there are broadly contemplated herein processes and arrangements for detecting the location of casing collars, such as that indicated at 108 in FIG. 3, simultaneously with running a drill string (including drill pipe) downhole during run-in-hole (i.e., the process of connecting drill pipe segments together and lowering the same into the wellbore). Thus, FIG. 4 provides a schematic elevational view of a DP-CCL sub 250 analogous to that indicated at 150 in FIG. 3.

Figure 4:
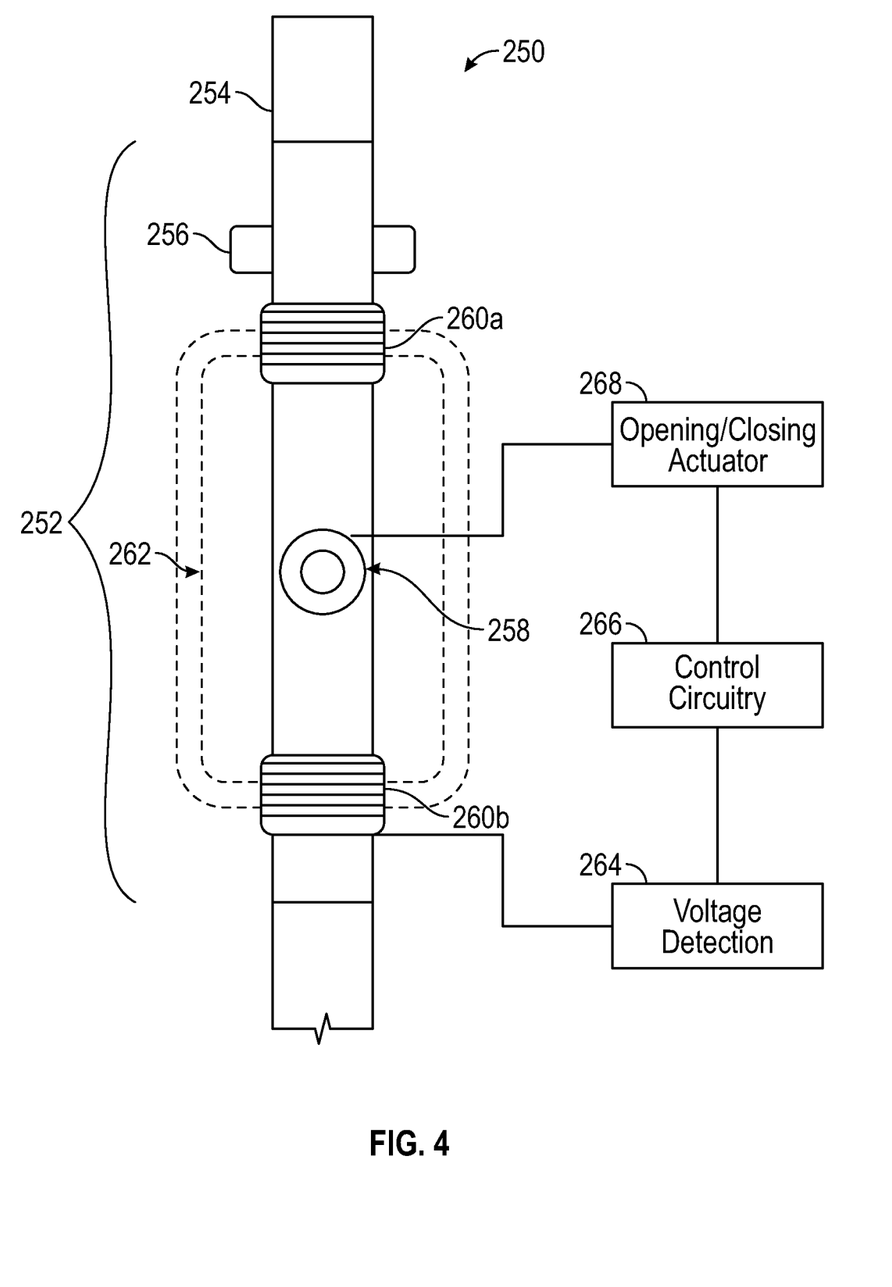
FIG. 4 is a schematic elevational view of a sub-assembly in accordance with one or more embodiments.

In accordance with one or more embodiments, and with continued reference to FIG. 4, the DP-CCL sub 250 includes a casing collar detection apparatus (indicated generally at 252) as a constituent portion of a segment of drill pipe 254. The detection apparatus 252 thus includes an annular sleeve 256, formed from rubber, disposed at an external surface of the sub 250, and a bypass port 258 disposed through the wall (e.g., cylindrical wall) defining the DP-CCL sub 250. The rubber sleeve 256, positioned axially above the bypass port 258, may be generally annular or toroidal in shape, and is dimensioned to conform to the inner diameter (ID) of the casing. Though only one bypass port 258 is shown, this is merely provided by way of illustrative example. Accordingly, in at least one variant embodiment, it is possible to include two or more bypass ports which operate in tandem such that they can open and close simultaneously (and in a manner to be better appreciated herebelow). For its part, the annular sleeve 256 may be formed from a synthetic rubber such as a fluoroelastomer, with characteristics suitable for exposure to hydrocarbons and to higher temperatures (e.g., up to 200 degrees Celsius). By way of illustrative example, such fluoroelastomers may be drawn from the "AFLAS" (registered trademark) product line, as manufactured by AGC Chemicals Americas, Inc. (Exton, Pa.). Alternatively, in at least one variant embodiment, the annular sleeve 256 may be formed from a material other than rubber.

In accordance with one or more embodiments, annular sleeve 256 may have an outer diameter (OD) that is slightly smaller than the ID of the casing (e.g., about ⅛ inch smaller). This will permit a very restricted flow of fluid past the sleeve 256 (in an axial direction) while avoiding any appreciable issues with friction as the sleeve 256 displaces axially with respect to the casing.

In accordance with one or more embodiments, as the rubber sleeve 256 conforms to the ID of the surrounding casing, it serves to divert any fluid or liquid flow from outside of the drill pipe 254 into the bypass port 258, and into the generally cylindrical space defining an interior portion of the drill pipe 254, as the drill pipe 254 (and sub 250) is deployed downwardly in the wellbore. As will be better appreciated herebelow, the bypass port 258 includes hardware for permitting its selective closing and reopening under given conditions.

As such, in accordance with one or more embodiments, the DP-CCL sub 250 (and detection apparatus 252) may also include a pair of magnetized coils 260a and 260b, which serve to emit a constant electromagnetic field 262 around the sub 250. As shown, the two coils 260a and 260b are generally annular in shape and disposed about an outer surface of the drill pipe 254. Further, the coils 260a and 260b may be spaced apart along the drill pipe 254, at a predetermined axial distance from one another and positioned such that the bypass port 258 is located axially at a midpoint therebetween. By way of illustrative example, coils 260a and 260b may be spaced apart at an axial distance of about six feet, while annular sleeve 256 may be axially spaced from the upper coil 260a at a distance of about five feet; also, these spacings may be considered to be independent of the OD of the drill pipe.

In accordance with one or more embodiments, as the DP-CCL sub 250 displaces axially downwardly with respect to a surrounding casing, the electromagnetic field 262 will remain constant for as long as the sub 250 does not pass any collars in the casing (e.g., such as that indicated at 108 in FIG. 3). Particularly, for as long as the surrounding casing is defined by a length of metal pipe of substantially uniform ID and OD, the electromagnetic field 262 will generally not be appreciably disrupted. However, as the DP-CCL sub 250 displaces past a casing collar (e.g., such as that indicated at 108 in FIG. 3), where there is a change in metal thickness, the magnetic field 262 will be interrupted or distorted. Generally, in accordance with a working example, the coils 260a and 260b are pre-magnetized prior to run-in-hole; in turn, this pre-magnetization may be tuned or configured in such a way as to readily create a magnitude of voltage that can then be detected, and as may be deemed sufficient or suitable.

As such, in accordance with one or more embodiments, the aforementioned interruption/distortion of magnetic field will create a small voltage that is detected by a voltage detection device 264. If the detected voltage exceeds a predetermined threshold, then control circuitry 266 may transmit a signal to activate an opening/closing actuator 268 which closes the bypass port 258. Accordingly, once the DP-CCL sub 250 has then displaced past the casing collar the electromagnetic field 262 will return to its original state, the voltage detection device 264 will detect a voltage (e.g., zero) lower than the aforementioned threshold, and the control circuitry 266 will transmit a signal to activate (or prompt) the opening/closing actuator 268 to reopen the bypass port 258.

In accordance with one or more embodiments, voltage detection device 264 may be embodied by essentially any suitable arrangement, such as simple electronics incorporated into the DP-CCL sub 250. For its part, bypass port 258 may include essentially any suitable component or components for opening and closing an associated aperture, e.g., a spring-loaded flapper valve controlled by a suitable actuator 268. Control circuitry 266 for controlling the actuator 268 may also be incorporated into the DP-CCL sub 250. It should also be understood that voltage detection device 264 and control circuitry 266 may incorporate some simple computer logic, e.g., to differentiate smaller voltage fluctuations deriving from noise (which then would not activate closing of the bypass port 258) as opposed to more significant voltage fluctuations deriving from the effect of the casing collar as discussed. Via appropriate circuitry and connections, the computer logic may alternatively be incorporated into a larger computer system (e.g., such as that indicated at 802 in FIG. 7).

Figure 5:
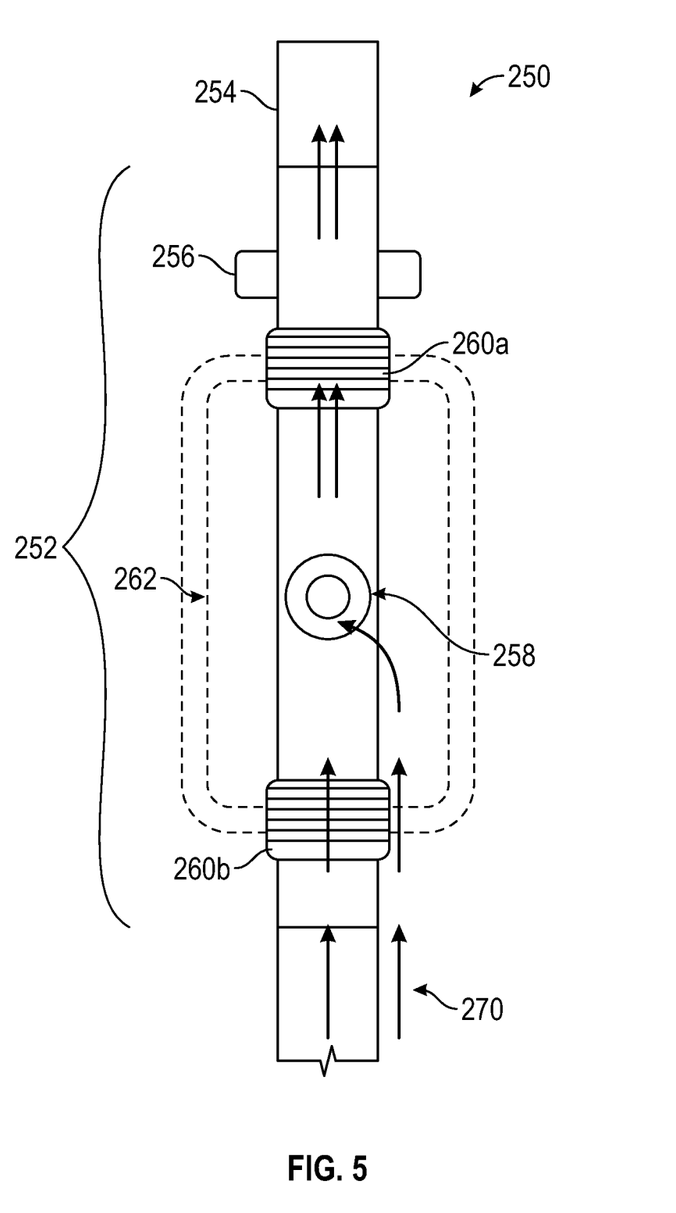
FIG. 5 is essentially the same view as FIG. 4, but additionally illustrating a fluid flow path through an open bypass port, in accordance with one or more embodiments.

FIG. 5 is essentially the same view as FIG. 4, but additionally illustrating a fluid flow path 270 through an open bypass port, in accordance with one or more embodiments. As such, as the drill pipe 254 is run-in-hole, within a surrounding casing, and proceeds downhole (e.g., at a constant axial speed, in a downward direction with respect to the figure), the bypass port 258 will mainly be in an open position and the rubber sleeve 256 will divert fluid from outside of the drill pipe 254 (and inside the surrounding casing) into the generally cylindrical space defining an interior portion of the drill pipe 254. Thus, the upward arrows illustrate the related path of fluid flow (270).

Figure 6:
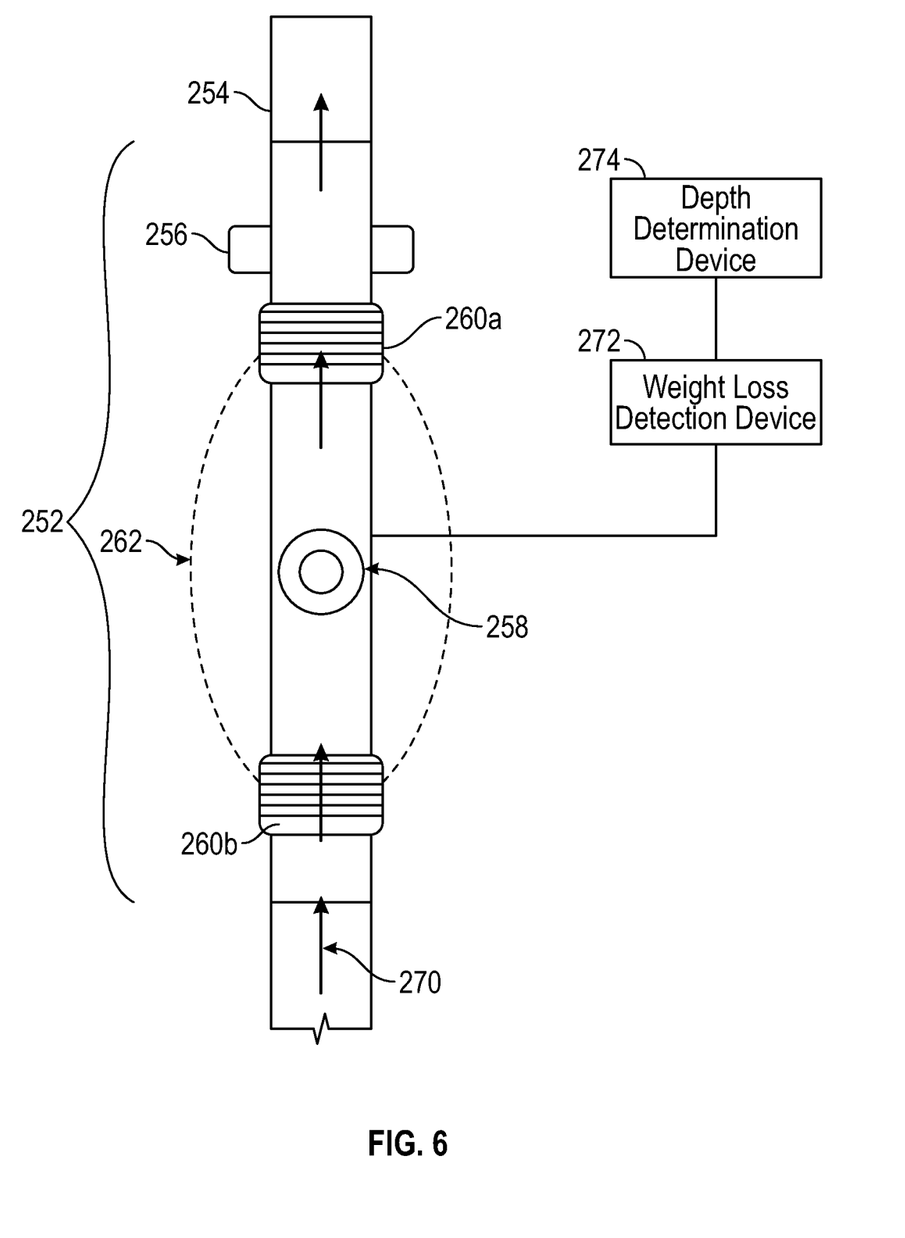
FIG. 6 is essentially the same view as FIGS. 4 and 5, but illustrating a fluid flow path with a closed bypass port, in accordance with one or more embodiments.

As such, FIG. 6 is essentially the same view as FIGS. 4 and 5, but illustrating the fluid flow path 270 with a closed bypass port, in accordance with one or more embodiments. As such, when the DP-CCL sub 250 is deploying downwardly (with respect to the figure) and passes by a casing collar, its magnetic field 262 will be interrupted, thereby activating the closing of the bypass port 258. This sudden restriction of flow will cause an immediate, detectable weight loss relative to the drill pipe 254, detected by a suitable weight loss detection device 272. Any and all such "spikes" can be logged/recorded at the surface, e.g., via a depth determination module or device 274 which receives weight loss data and, via a subroutine or algorithm housed at a computer (e.g., via a processor 805 in a computer 802 such as that shown in FIG. 7), can determine the depths where these weight loss spikes occur, which then can be understood as corresponding to the depths where respective casing collars are located.

In accordance with one or more embodiments, weight loss detection device 272 and depth determination device 274 may be embodied by logic in communication with a rig hook load system, where recordations may be made of hook load weight against depth during run-in-hole. Thus, by way of illustrative example, any significant change in hook load weight may be shown as a spike on a plot of hook load versus depth.

By way of advantages in accordance with one or more embodiments, having the capability to detect casing collars while running-in-hole with a drill string will eliminate the need to run CCL tools on a wireline, thus saving rig time in addition to saving costs for wireline tool services and rentals. Additionally, compared to known arrangements, the present concepts will not be limited to high inclination wells, as wireline-based methods will require additional equipment to be deployed in high inclination wells (i.e., wells that are angled or oriented significantly away from strictly vertical). Further, in contrast to known arrangements, there is no need to pump fluid down a work string (positioned within a casing string) for detecting collars.

Figure 7:
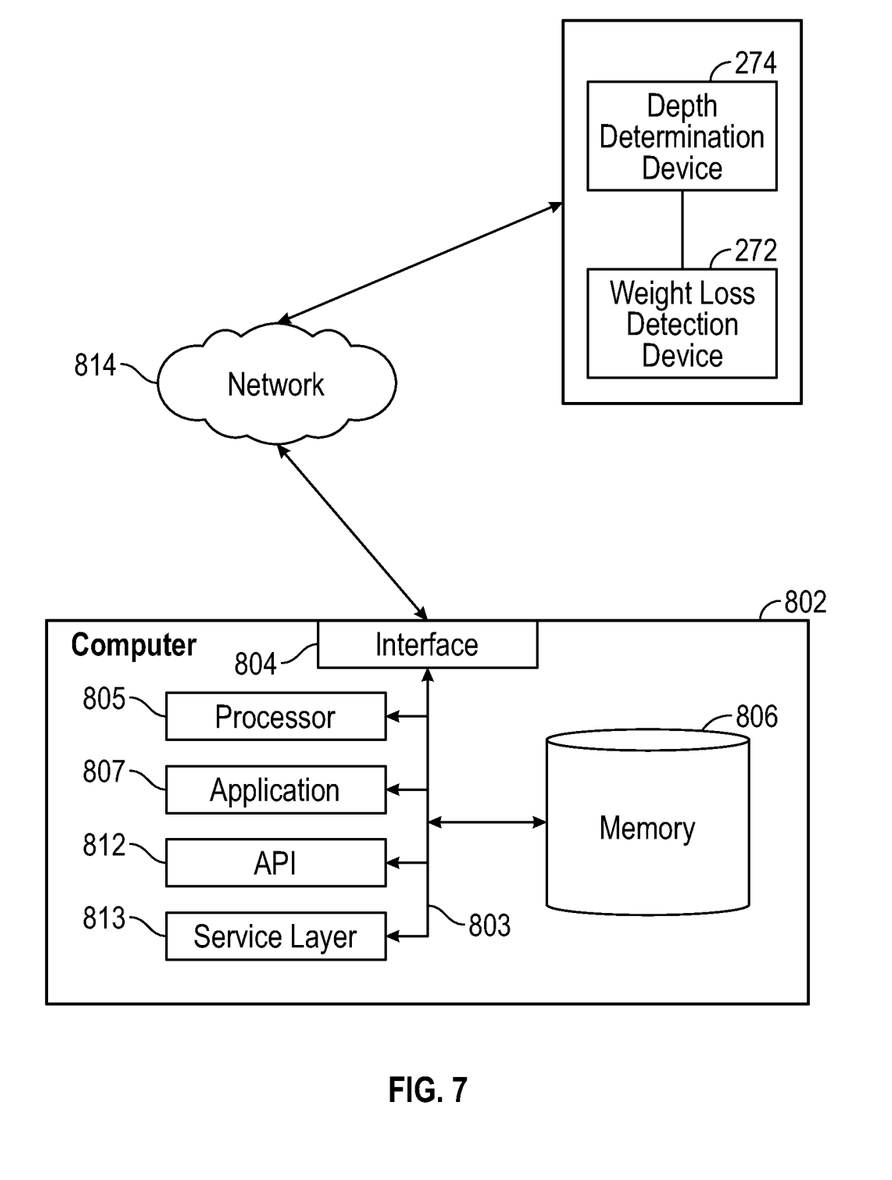
FIG. 7 schematically illustrates a computing device and related components, in accordance with one or more embodiments.

FIG. 7 schematically illustrates a computing device and related components, in accordance with one or more embodiments. As such, FIG. 7 generally depicts a block diagram of a computer system 802 used to provide computational functionalities associated with described algorithms, methods, functions, processes, flows, and procedures as described in this disclosure, according to one or more embodiments. In this respect, computer 802 may interface with a depth determination device 274 and/or weight loss detection device such as those described and illustrated with respect to FIG. 6, either directly (e.g., via hard-wired connection) or over an internal or external network 814.

In accordance with one or more embodiments, the illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 802 may include a computer that includes an input device, such as a keypad, keyboard, touch screen, or other device that can accept user information, and an output device that conveys information associated with the operation of the computer 802, including digital data, visual, or audio information (or a combination of information), or a GUI.

The computer 802 can serve in a role as a client, network component, a server, a database or other persistency, or any other component (or a combination of roles) of a computer system for performing the subject matter described in the instant disclosure. The illustrated computer 802 is communicably coupled with a network 814. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, business intelligence (BI) server, or other server (or a combination of servers).

The computer 802 can receive requests over network 814 from a client application (for example, executing on another computer 802) and responding to the received requests by processing the said requests in an appropriate software application. In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803 using an application programming interface (API) 812 or a service layer 813 (or a combination of the API 812 and service layer 813. The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or another suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 7, two or more interfaces 804 may be used according to particular needs, desires, or particular implementations of the computer 802. The interface 804 is used by the computer 802 for communicating with other systems in a distributed environment that are connected to the network 814. Generally, the interface 804 includes logic encoded in software or hardware (or a combination of software and hardware) and operable to communicate with the network 814. More specifically, the interface 804 may include software supporting one or more communication protocols associated with communications such that the network 814 or interface's hardware is operable to communicate physical signals within and outside of the illustrated computer 802.

The computer 802 includes at least one computer processor 805. Although illustrated as a single computer processor 805 in FIG. 6, two or more processors may be used according to particular needs, desires, or particular implementations of the computer 802. Generally, the computer processor 805 executes instructions and manipulates data to perform the operations of the computer 802 and any algorithms, methods, functions, processes, flows, and procedures as described in the instant disclosure.

The computer 802 also includes a memory 806 that holds data for the computer 802 or other components (or a combination of both) that can be connected to the network 814. For example, memory 806 can be a database storing data consistent with this disclosure. Although illustrated as a single memory 806 in FIG. 6, two or more memories may be used according to particular needs, desires, or particular implementations of the computer 802 and the described functionality. While memory 806 is illustrated as an integral component of the computer 802, in alternative implementations, memory 806 can be external to the computer 802.

The application 807 is an algorithmic software engine providing functionality according to particular needs, desires, or particular implementations of the computer 802, particularly with respect to functionality described in this disclosure. For example, application 807 can serve as one or more components, modules, applications, etc. Further, although illustrated as a single application 807, the application 807 may be implemented as multiple applications 807 on the computer 802. In addition, although illustrated as integral to the computer 802, in alternative implementations, the application 807 can be external to the computer 802.

There may be any number of computers 802 associated with, or external to, a computer system containing computer 802, wherein each computer 802 communicates over network 814. Further, the term "client," "user," and other appropriate terminology may be used interchangeably as appropriate without departing from the scope of this disclosure. Moreover, this disclosure contemplates that many users may use one computer 802, or that one user may use multiple computers 802.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system for locating a casing collar, said system comprising:
    a drill pipe sub-assembly which includes a drill pipe segment and a detection apparatus disposed at a portion of the drill pipe segment, the drill pipe segment comprising a wall and an interior portion defined within the wall;
    said detection apparatus comprising:
        a bypass port disposed in the wall and in fluid communication with the interior portion;
        an annular sleeve which directs fluid through the bypass port and into the interior portion;
        an actuator which opens and closes the bypass port; and
        two magnetized coils which interact to generate an electromagnetic field;
        wherein the actuator closes the bypass port in response to a predetermined voltage generated by the magnetized coils when the coils displace past a casing collar;
    a weight loss detection device which detects a loss of weight in the drill pipe segment after closing of the bypass port; and
    a depth determination device which determines a depth of the casing collar, based on the detected loss of weight.

2. The system according to claim 1, wherein the detection apparatus further comprises:
    a voltage detection device which detects the predetermined voltage generated by the magnetized coils; and
    control circuitry which controls the actuator;
    wherein the control circuitry prompts the actuator to close the bypass port in response to the predetermined voltage detected by the voltage detection device.

3. The system according to claim 2, wherein the actuator reopens the bypass port in response to the predetermined voltage not being detected.

4. The system according to claim 3, wherein the control circuitry prompts the actuator to reopen the bypass port in response to the predetermined voltage not being detected by the voltage detection device.

5. The system according to claim 4, wherein the two magnetized coils are axially spaced apart from one another along the drill pipe segment.

6. The system according to claim 5, wherein each of the two magnetized coils is generally annular in shape and disposed at an outer surface of the drill pipe segment.

7. The system according to claim 6, wherein the bypass port is located axially between the two magnetized coils.

8. The system according to claim 7, wherein the bypass port is located axially at a midpoint between the two magnetized coils.

9. The system according to claim 8, wherein the annular sleeve is a rubber sleeve.

10. The system according to claim 9, wherein the rubber sleeve is axially spaced apart from one of the magnetized coils, and on a different side thereof from the bypass port.

11. A method comprising:
    providing a drill pipe sub-assembly which includes a drill pipe segment and a detection apparatus disposed at a portion of the drill pipe segment, the drill pipe segment comprising a wall and an interior portion defined within the wall;
    wherein providing a detection apparatus comprises:
        disposing a bypass port in the wall and in fluid communication with the interior portion; and
        providing two magnetized coils which interact to generate an electromagnetic field;
    deploying the sub-assembly into a casing in a wellbore;
    directing fluid through the bypass port into the interior portion;

displacing the sub-assembly past a casing collar, and thereupon closing the bypass port in response to a predetermined voltage generated by the magnetized coils;

detecting a loss of weight in the drill pipe segment after closing of the bypass port; and determining a depth of the casing collar, based on the detected loss of weight.

12. The method according to claim 11, wherein providing the detection apparatus comprises providing an actuator which opens and closes the bypass port.

13. The method according to claim 12, further comprising:

detecting the predetermined voltage generated by the magnetized coils; and prompting the actuator to close the bypass port in response to the predetermined voltage detected.

14. The method according to claim 13, further comprising prompting the actuator to reopen the bypass port in response to the predetermined voltage not being detected.

15. The method according to claim 14, wherein the two magnetized coils are axially spaced apart from one another along the drill pipe segment.

16. The method according to claim 15, wherein each of the two magnetized coils is generally annular in shape and disposed at an outer surface of the drill pipe segment.

17. The method according to claim 16, wherein the bypass port is located axially at a midpoint between the two magnetized coils.

18. The method according to claim 17, wherein providing the detection apparatus comprises providing an annular sleeve which directs fluid into the bypass port.

19. The method according to claim 18, wherein the annular sleeve comprises a rubber sleeve which is axially spaced apart from one of the magnetized coils, and on a different side thereof from the bypass port.

20. A drill pipe sub-assembly comprising:

a drill pipe segment comprising a wall and an interior portion defined within the wall; and a detection apparatus disposed at a portion of the drill pipe segment;

said detection apparatus comprising:

a bypass port disposed in the wall and in fluid communication with the interior portion;

an annular sleeve which directs fluid through the bypass port and into the interior portion;

an actuator which opens and closes the bypass port; and two magnetized coils which are generally annular shape, are axially spaced apart from one another along the drill pipe segment, and interact to generate an electromagnetic field;

the bypass port being located axially between the two magnetized coils; and the annular sleeve being axially spaced apart from one of the magnetized coils, and on a different side thereof from the bypass port;

wherein the actuator closes the bypass port in response to a predetermined voltage generated by the magnetized coils when the coils displace past a casing collar.

* * * * *